United States Patent
Chen et al.

(10) Patent No.: US 7,327,565 B2
(45) Date of Patent: Feb. 5, 2008

(54) MOUNTING APPARATUS FOR STORAGE DEVICES

(75) Inventors: Hsuan-Tsung Chen, Tu-Cheng (TW); Shao-Bo Han, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 303 days.

(21) Appl. No.: 10/951,425

(22) Filed: Sep. 28, 2004

(65) Prior Publication Data
US 2005/0121581 A1   Jun. 9, 2005

(30) Foreign Application Priority Data
Dec. 9, 2003  (TW) .............................. 92221605 U

(51) Int. Cl.
*H05K 5/00* (2006.01)
(52) U.S. Cl. .................. 361/685; 248/27.3; 211/41.17; 312/334.7
(58) Field of Classification Search ............... 248/27.1, 248/27.3, 316.8, 250, 222.11, 298.1; 211/47.17, 211/26; 312/334.7, 223.2, 334.14, 332.1; 361/683, 685, 684, 727, 725
See application file for complete search history.

(56) References Cited

U.S. PATENT DOCUMENTS

| 5,262,923 | A | 11/1993 | Batta et al. ................. 361/685 |
| 5,599,080 | A | 2/1997 | Ho ........................... 312/334.7 |
| 5,683,159 | A | 11/1997 | Johnson .................... 312/334.7 |
| 5,734,557 | A | 3/1998 | McAnally et al. .......... 361/727 |
| 6,370,022 | B1* | 4/2002 | Hooper et al. .............. 361/685 |
| 6,377,447 | B1* | 4/2002 | Boe ........................... 361/685 |
| 6,385,036 | B1 | 5/2002 | Chien ......................... 361/683 |
| 7,036,783 | B2* | 5/2006 | Chen et al. ............. 248/298.1 |
| 7,068,502 | B2* | 6/2006 | Chen et al. .................. 361/685 |

FOREIGN PATENT DOCUMENTS

TW           264090           11/1995

* cited by examiner

*Primary Examiner*—Anita M. King
(74) *Attorney, Agent, or Firm*—Morris Manning Martin LLP; Tim Tingkang Xia, Esq.

(57) ABSTRACT

A mounting apparatus includes a bracket (50) for receiving a storage device (60) therein. A position-translating member (10) is attached to outside of the bracket selectively at first and second positions. A slidable member (30) is slidably attached to the position-translating member. A retention member (20) is received in the slidable member. The retention member includes four latches (213) for engaging in the storage device at the first and second positions thereby securely attaching the storage device in the bracket.

23 Claims, 7 Drawing Sheets

MOUNTING APPARATUS FOR STORAGE DEVICES

BACKGROUND OF THE INVENTION

1. Field of the Invention

The present invention relates to a mounting apparatus, and more particularly to a mounting apparatus for storage devices.

2. Description of the Related Art

The manufacture and assembly of electronic apparatuses has become increasingly more competitive. Manufacturers continually strive to improve the design and features of electronic apparatuses yet still offer competitive prices. One such area of improvement is mounting of devices in an electronic apparatus. An electronic apparatus, such as a typical desktop computer, tower, server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user.

Typically, such storage devices are accommodated in a bracket of a computer case. A typical storage device has numerous sets of mounting holes defined in each side thereof partially for purpose of adaptation for different mounting positions. However, the predefined mounting holes are not yet enough in some special instances, so another storage device having different size has to be introduced. In other words, the typical computer case can not accommodate storage devices of different sizes.

U.S. Pat. No. 5,683,159 teaches one aforementioned typical mounting apparatus. The mounting apparatus includes a slide rail for mounting internal devices inside a computer case. The slide rail includes a biased mounting post which mates with matching mounting holes on opposite sides of the internal device. As the internal device is slid inside the computer case, the biased mounting posts protrude into the mounting holes of the internal device to reversibly affix the internal device to the computer case. However, the mounting apparatus can not accommodate internal devices of different sizes. Furthermore, the internal device together with the slide rail has to be withdrawn from the computer case when it is desired to change the mounting positions of the internal device.

SUMMARY OF THE INVENTION

Accordingly, an object of the present invention is to provide a mounting apparatus which is suitable for securing storage devices of different sizes.

Another object of the present invention is to provide a mounting apparatus which can change mounting positions of storage device without withdrawing the storage devices in advance.

To achieve the above objects, a mounting apparatus in accordance with the present invention comprises a bracket for receiving a storage device. A position-translating member is attached to the bracket selectively at first and second positions. A slidable member is slidably attached to the position-translating member. A retention member is received in the slidable member. The retention member comprises four latches for engaging in the storage device at the first and second positions thereby securely attaching the storage device in the bracket.

Other objects, advantages and novel features of the present invention will be drawn from the following detailed description of a preferred embodiment of the present invention with the attached drawings, in which:

DETAILED DESCRIPTION OF THE PRESENT INVENTION

Figure 1:
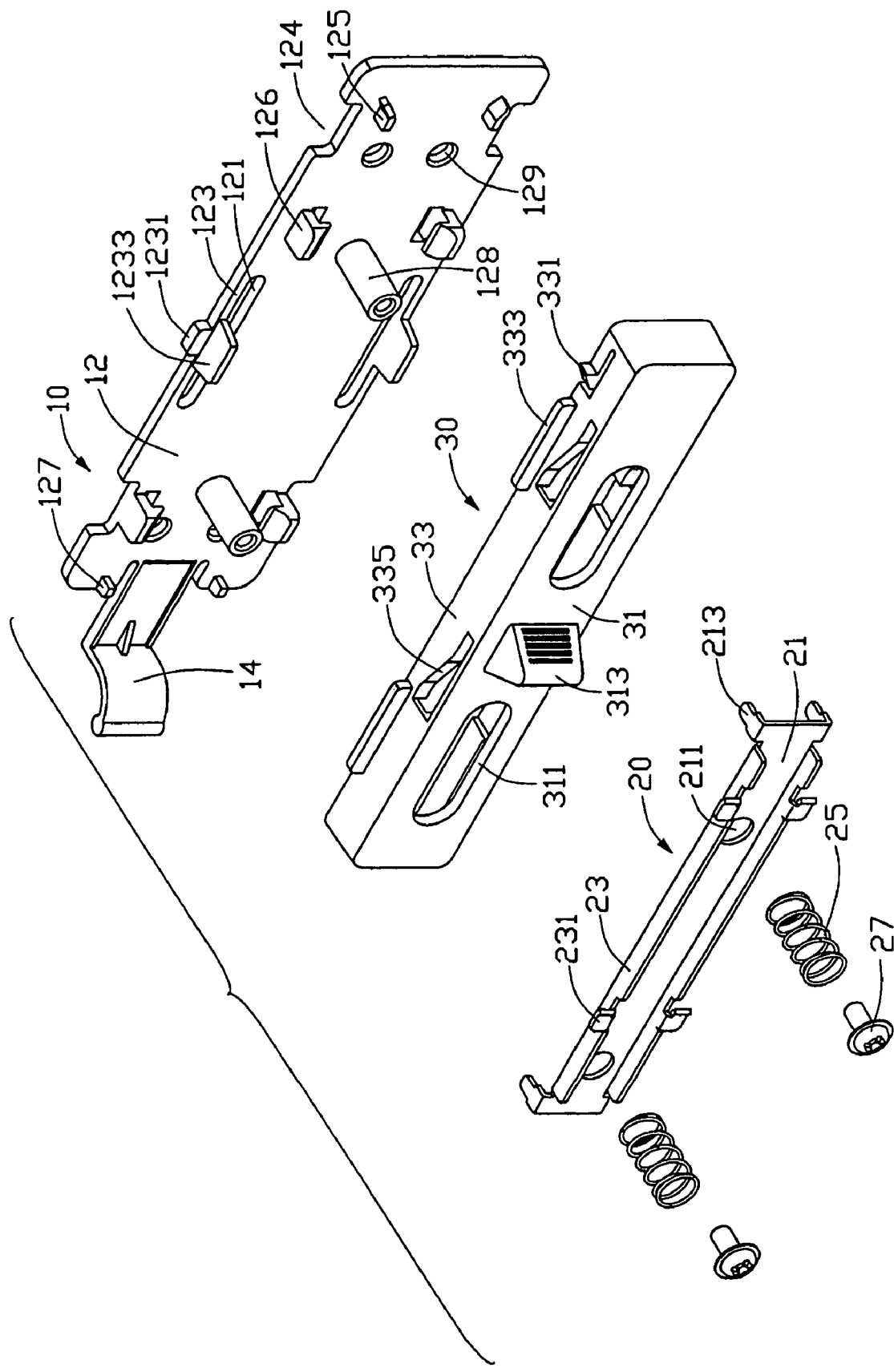
FIG. 1 is an exploded, isometric view of a mounting apparatus in accordance with a preferred embodiment of the present invention, the mounting apparatus comprising a position-translating member, a retention member, a slidable member, a pair of coil springs, a pair of screws and a bracket (not shown)
Figure 2:
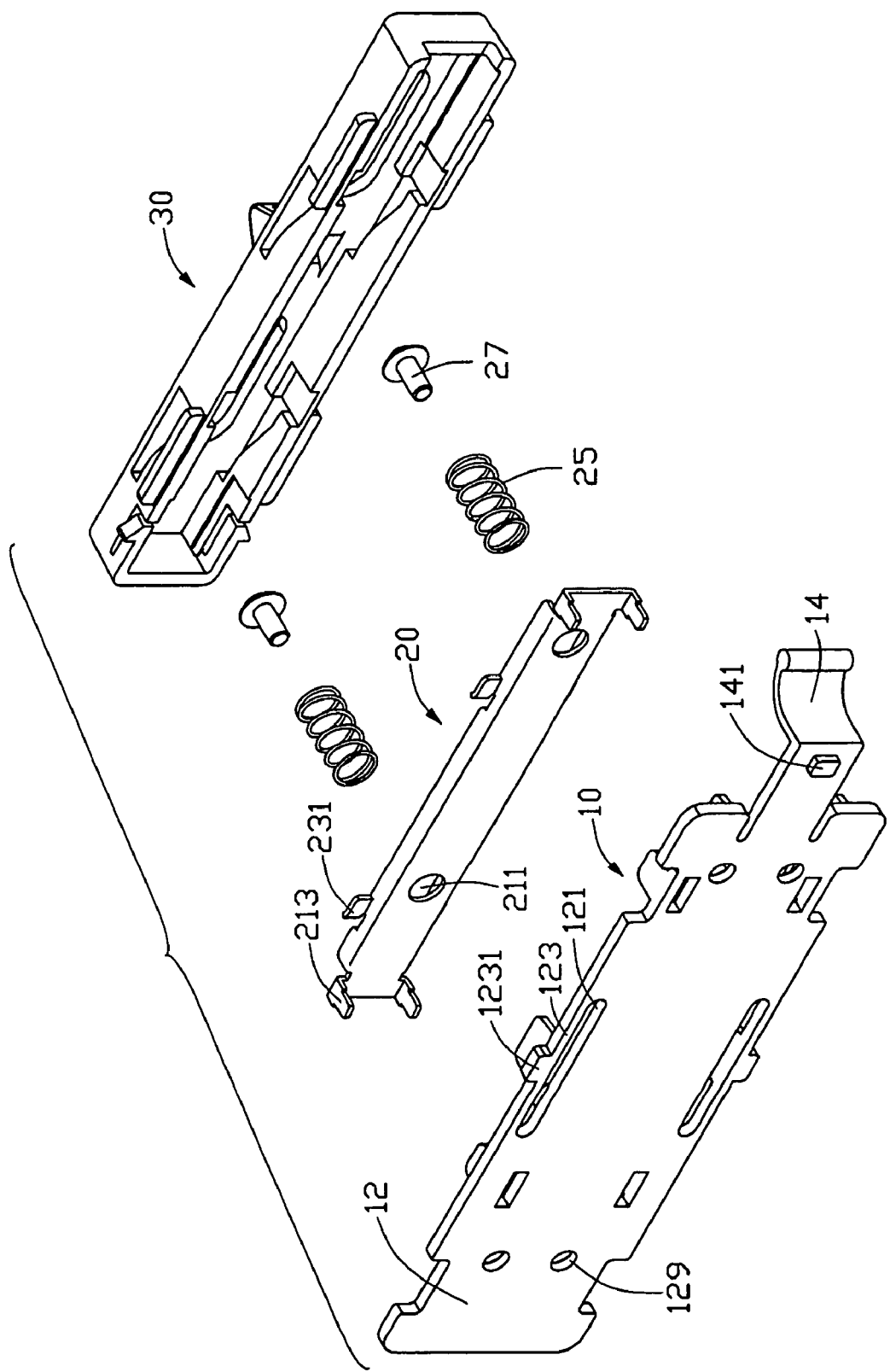
FIG. 2 is similar to FIG. 1, but viewed from another aspect.
Figure 3:
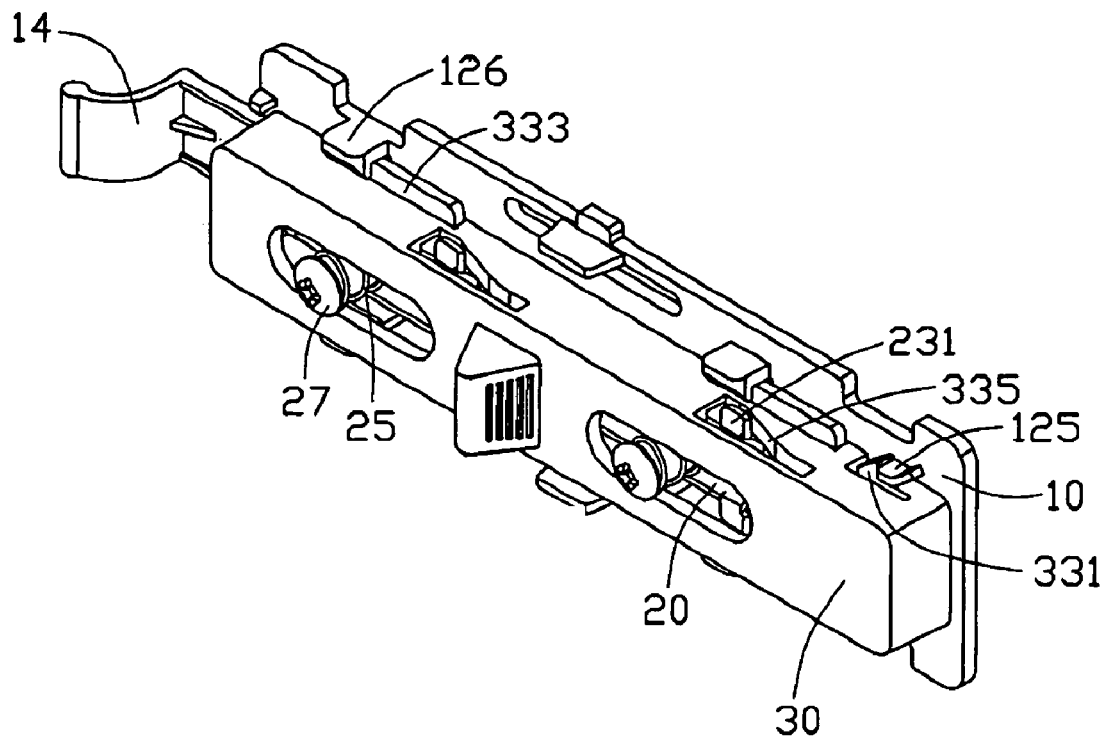
FIG. 3 is an assembled view of FIG. 1.
Figure 4:
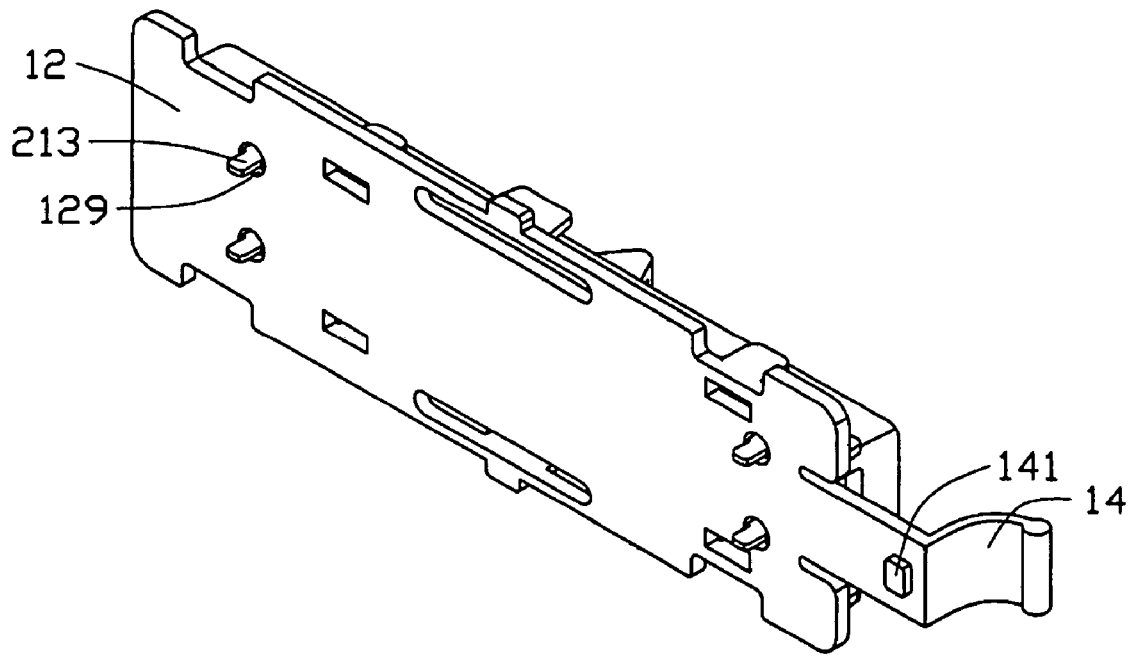
FIG. 4 is an assembled view of FIG. 2.

Referring to FIGS. 1, 2, 5 and 6, a mounting apparatus in accordance with the preferred embodiment of the present invention is provided for holding a storage device 60 in place. The mounting apparatus comprises a position-translating member 10, a retention member 20, a slidable member 30 and a bracket 50. The retention member 20 and the slidable member 30 cooperatively fix the storage device in the bracket 50.

The position-translating member 10 comprises a main body 12, and a resilient handle 14 extending from a front end of the main body 12. The main body 12 is shaped as a rectangle plate. A pair of longitudinal slots 121 is defined in middle portions of the main body 12 adjacent to upper and lower edges respectively, thereby forming a pair of resilient portions 123 respectively. A tab 1231 protrudes outwardly from each resilient portion 123 at a middle portion thereof. A protrusion 1233 is extended perpendicularly from each resilient portion 123, for manipulating corresponding resilient portions 123. A pair of cutouts 124 is defined from the upper and lower edges respectively near each of the front end and a rear end of the main body 12. A pair of vertically spaced guiding pieces 125 is formed on the main body 12 proximal to the rear end of the main body 12. A pair of vertically spaced clutches 126 is formed on the main body 12 between the protrusions 1233 and the guiding pieces 125. Another pair of clutches 126 is formed on the main body 12 adjoining the cutouts 124 proximal to the front end thereof. Two blocking pieces 127 are located on the front end of the main body 12 adjacent to upper and lower sides of the handle 14 respectively. A pair of horizontally aligned projections 128 is perpendicularly outwardly formed on the main body 12 proximal to corresponding pair of clutches 126 respectively. Each projection 128 defines an internal threaded hole. A pair of vertically spaced through-holes 129 is defined between the front end of the main body 12 and corresponding clutches 126, the through holes 129 being proximal to corresponding clutches 126. Another pair of through-holes 129 is defined in the main body 12 proximal to the guiding pieces 125. A block 141 (particularly see FIG. 2) is formed on an inner surface of the handle 14.

The retention member 20 comprises a rectangle plate 21, and a pair of through-holes 211 is defined in the plate 21, corresponding to the projections 128 of the position-translating member 10. A pair of latches 213 is bent inwardly from each end of the plate 21, corresponding to the through-holes 129 of the position-translating member 10. A pair of flanges 23 is bent perpendicularly outwardly from upper and lower edges of the plate 21. A pair of spaced sliding portions 231 is bent perpendicularly upwardly from an edge of the flange 23 at the upper edge of the plate 21. A pair of fasteners such as screws 27 is provided to attach a pair of resilient members such as coil springs 25 between the screws 27 and the plate 21 by cooperating with corresponding projections 128.

The slidable member 30 is generally box-shaped. The slidable member 30 comprises a vertical wall 31. A pair of spaced apertures 311 is defined in the vertical wall 31, corresponding to the screws 27. A grip 313 is formed on the vertical wall 31 and between the apertures 311. A pair of horizontal walls 33 is extended inwardly from upper and lower edges of the vertical wall 31 respectively. A pair of hooks 331 is formed on the horizontal walls 33 respectively, corresponding to the guiding pieces 125 of the position-translating member 10. A pair of spaced rails 333 is formed outwardly on each horizontal wall 33. A pair of slideways 335 is defined in inner surface of each horizontal wall 33, corresponding to the sliding portions 231 of the retention member 20. Each slideway 335 comprises a pair of flat end portions and a generally sloped middle portion connecting between the end portions.

Figure 5:
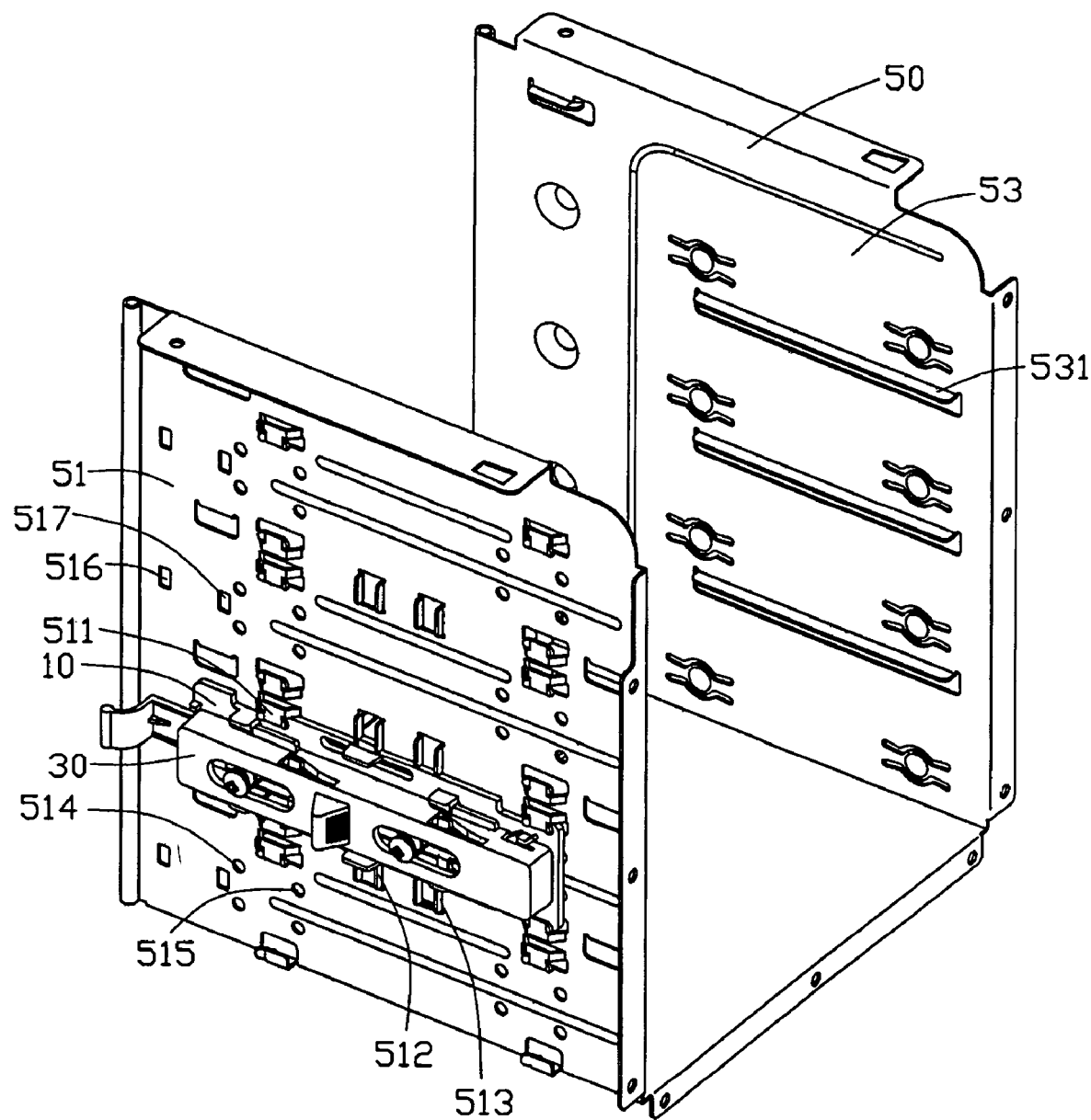
FIG. 5 is an isometric view of the assemble mounting apparatus, showing the position-translating member at a first position.
Figure 6:
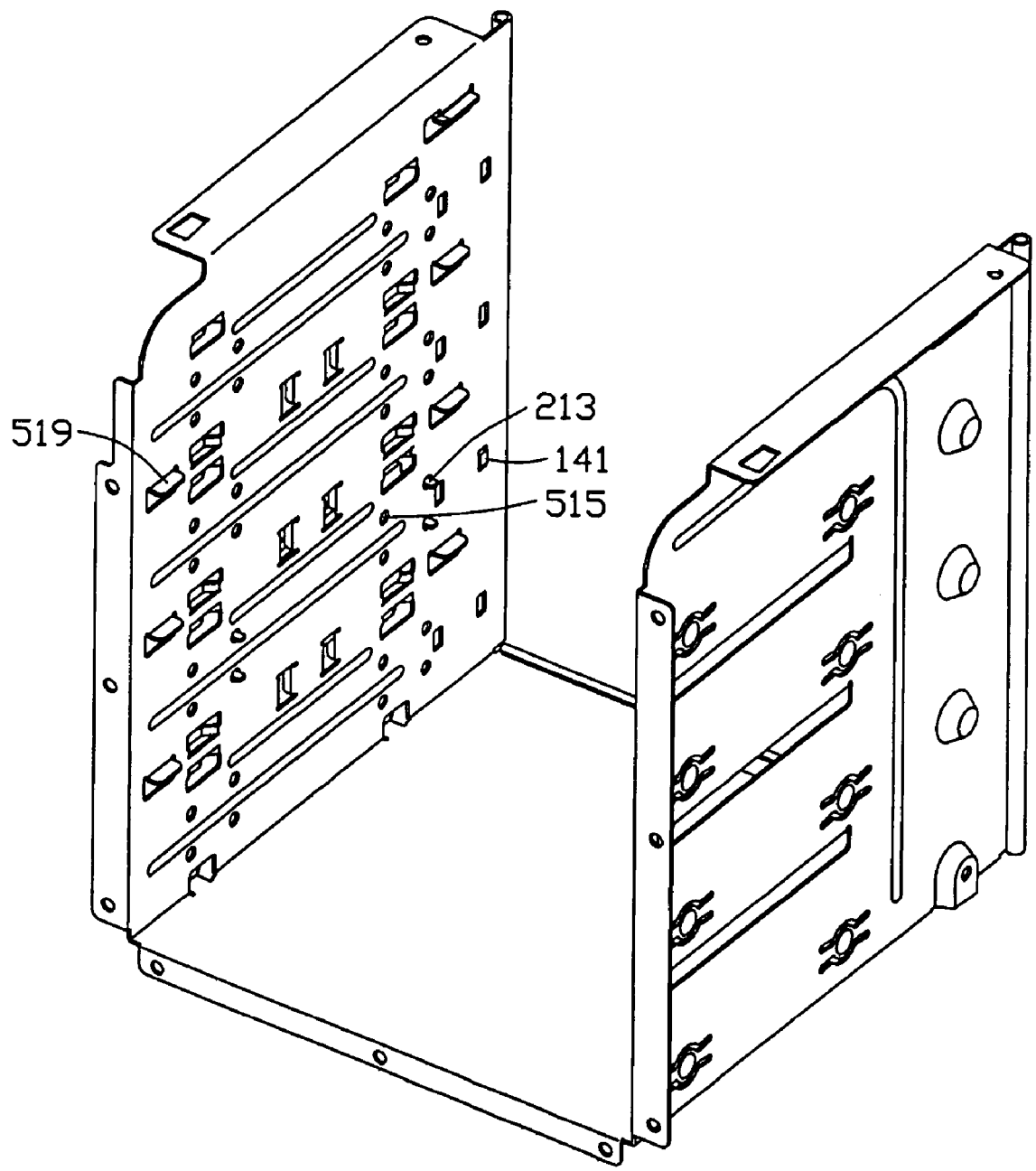
FIG. 6 is similar to FIG. 5, but viewed from another aspect.

Referring particularly to FIGS. 5 and 6, the bracket 50 comprises a pair of sidewalls 51, 53. A first pair of horizontally aligned retaining pieces 511 is punched outwardly from the sidewall 51 at a top portion thereof. A second pair of horizontally aligned retaining pieces 511 is vertically offset from the first pair of retaining pieces 511, for attaching one position-translating member 10 to the sidewall 51 by cooperating with the first pair of retaining pieces 511. Four first openings 514 are defined in the sidewall 51 between the first and second pairs of retaining pieces 511, corresponding to the latches 213 of the retention member 20. Four second openings 515 are rearward offset at a distance with respect to the first openings 514. A first block hole 516 is defined in a front edge portion of the sidewall 51, corresponding to the block 141 of the position-translating member 10. A second block hole 517 is rearward offset at the generally same distance between the first and second openings 514, 515 with respect to the first block hole 516. The retaining pieces 511, the first and second openings 514, 515 and the first and second block holes 516, 517 are together duplicated and disposed along the sidewall 51 from top to bottom thereof.

Three sets of horizontally spaced first and second catches 512, 513 are punched from the sidewall 51, corresponding to the tabs 1231 of the position-translating member 10. Each set of the first and second catches 512, 513 comprises a pair of opposite tabs respectively punched outwardly from the sidewall 51.

A plurality of bent plates 519 is punched inwardly from the sidewall 51. A plurality of bent plates 531 is punched inwardly from the sidewall 53, for supporting storage devices 60 thereon in cooperation with the bent plates 519 of the sidewall 51.

In assembly of the mounting apparatus, the retention member 20 is received in the slidable member 30. The sliding portions 231 are engaged with the slideways 335 of the slidable member 30 respectively. The slidable member 30 together with the retention member 20 is preliminarily positioned on the position-translating member 10. The hooks 331 of the slidable member 30 are disposed rearward relative to the guiding pieces 125 of the position-translating member 10. The rails 333 of the slidable member 30 are disposed rearward relative to corresponding clutches 126. The apertures 311 of the slidable member 30 are aligned with the projections 128 of the position-translating member 10 respectively. The slidable member 30 is then pushed forwardly toward the handle 14 of the position-translating member 10. The hooks 331 are slid over corresponding guiding pieces 125. The rails 333 are engaged with corresponding clutches 126. The guiding pieces 125 and the blocking pieces 127 cooperatively prevent the slidable member 30 from sliding away from the position-translating member 10. The screws 27 attach respective coil springs 25 between the screws 27 and the retention member 20 by engaging in corresponding projections 128.

The combined position-translating member 10, retention member 20 and slidable member 30 is placed on the sidewall 51 of the bracket 50, with cutouts 124 of the position-translating member 10 in alignment with four corresponding retaining pieces 511 of the sidewall 51. At least one tab 1231 of the position-translating member 10 is located between corresponding first and second catches 512, 513. The block 141 of the position-translating member 10 is located between corresponding first and second block holes 516, 517. The protrusions 1233 of the position-translating member 10 are pressed toward each other to deform resilient portions 123 respectively, the position-translating member 10 is simultaneously moved forwardly or rearward until said tab 1231 is aligned with corresponding first or second catches 512, 513. The retaining pieces 511 engage with the main body 12 of the position-translating member 10. The protrusions 1233 are then released, and the resilient portions 123 restore to drive said tab 1231 to engage with corresponding first or second catches 512, 513. The block 141 is engaged in corresponding first or second block holes 516, 517. The mounting apparatus is thus fully assembled.

Referring particularly to FIGS. 5 and 6, these two drawings respectively show an assembled mounting apparatus viewed from different aspects. The combined position-translating member 10, retention member 20 and slidable member 30 is attached between the lower two sets of first and second catches 512, 513. The tabs 1231 are engaged with the first catches 512 respectively. The block 141 is engaged in the first block hole 516.

Figure 7:
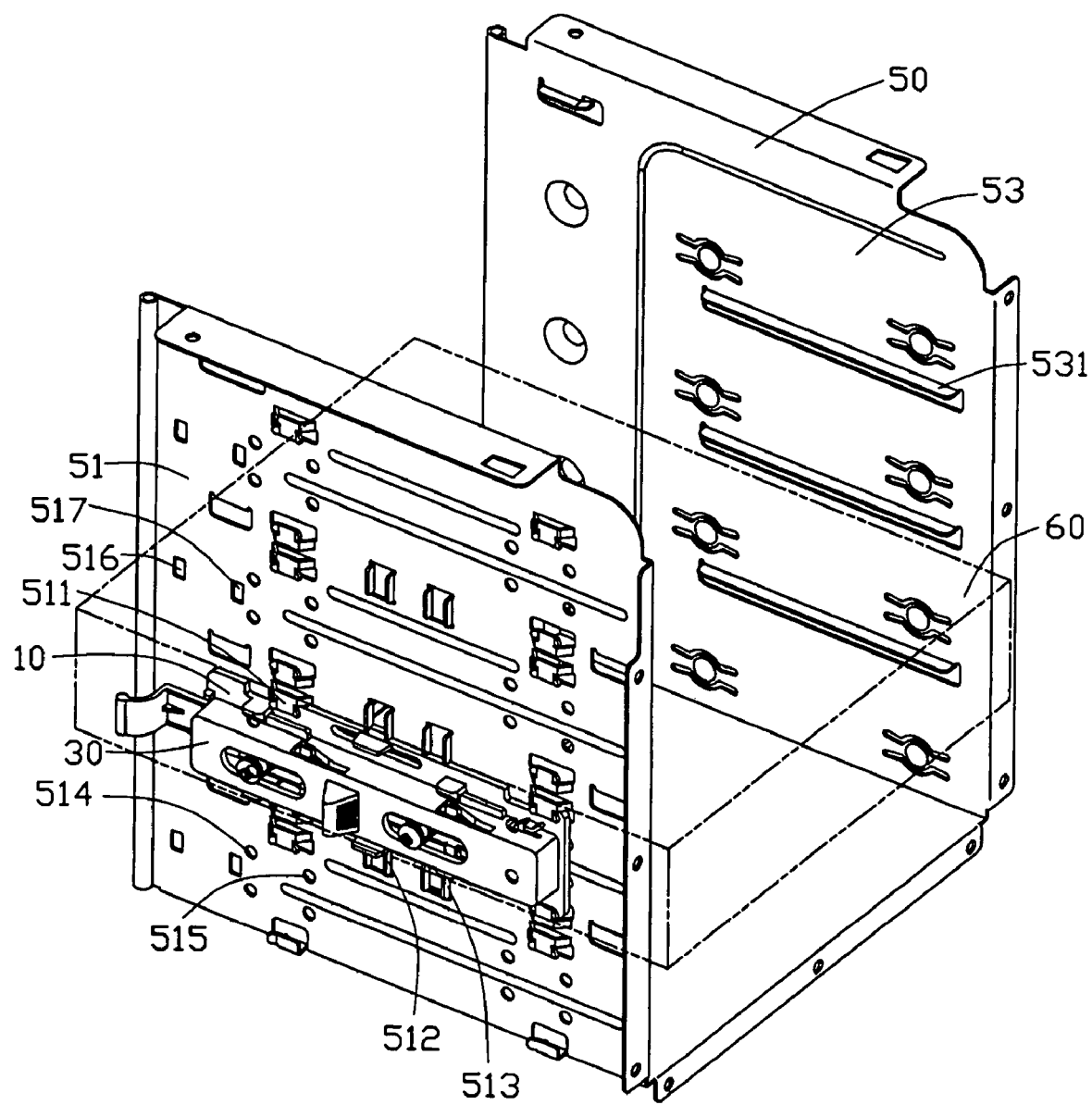
FIG. 7 is similar to FIG. 5, showing a storage device secured in the bracket at a first position.

In use of the mounting apparatus, referring particularly to FIG. 7, the storage device 60 shown in broken lines is securely received in the bracket 50, with latches 213 of the retention member 20 in engagement in corresponding latch holes (not labeled) of the storage device 60. The block 141 of the position-translating member 10 is engaged in the first block hole 516. The position-translating member 10 is designated as at a first position. The storage device 60 is also designated as at a first position.

Figure 8:
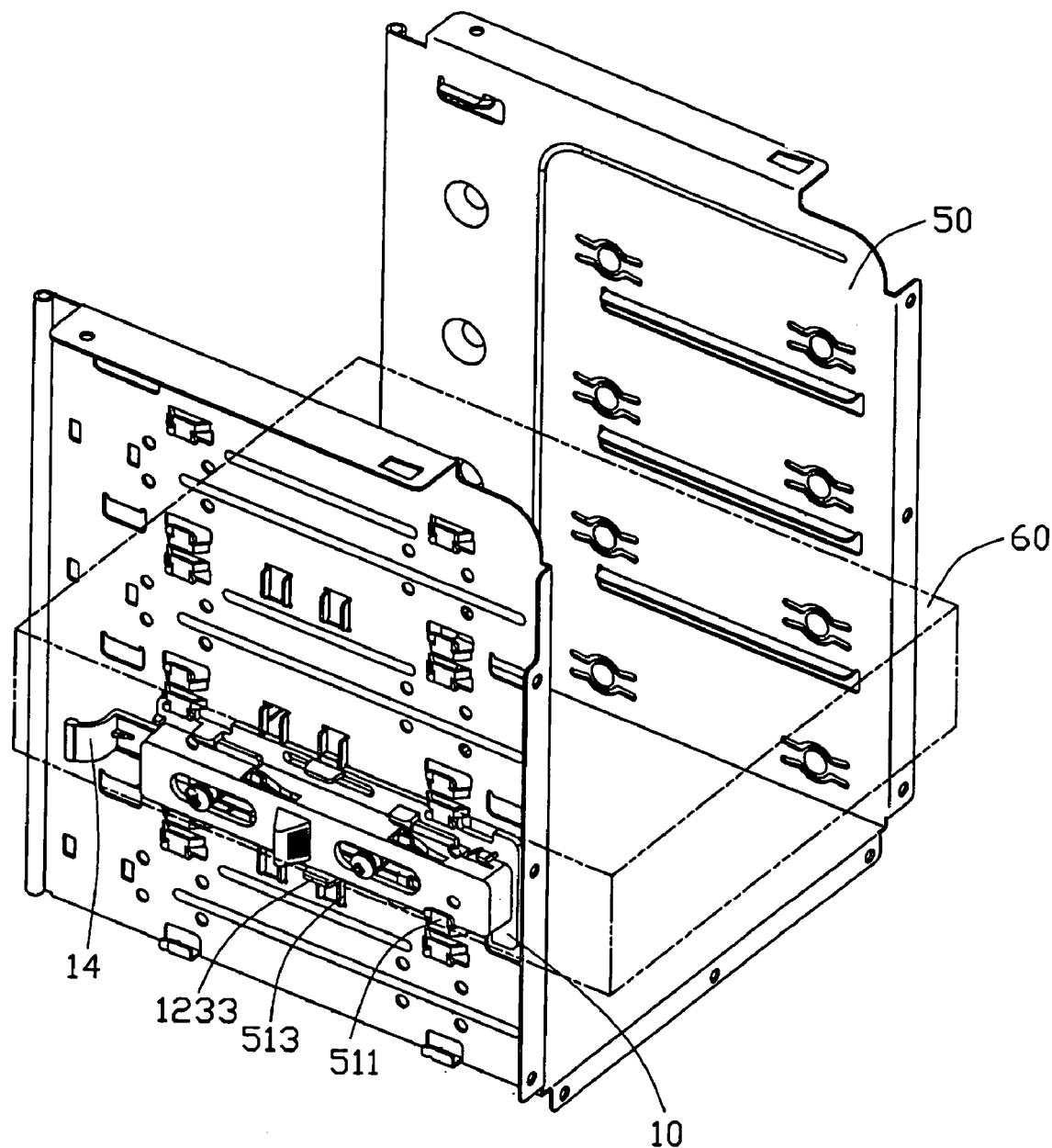
FIG. 8 is similar to FIG. 7, but showing the position-translating at a second position, and the storage device secured in the bracket at a second position.

If desired, the combined position-translating member 10, retention member 20 and slidable member 30 is able to be translated to a second position shown in FIG. 8. The slidable member 30 is pushed forward by manipulating the grip 313. The sliding portions 231 of the retention member 20 are relatively slid along the slideways 335 of the slidable member 30 respectively until the latches 213 are withdrawn from respective latch holes of the storage device 60. The coil springs 25 are compressed. The protrusions 1233 of the position-translating member 10 are then pressed toward each other to deform resilient portions 123 respectively, the tabs 1231 are disengaged from the first catches 512 of the bracket 50 respectively, the handle 14 is lifted to detach the block 141 from the first block hole 516, and the position-translating member 10 is simultaneously moved rearward until the tabs 1231 are aligned with corresponding second catches 512, 513. Then, the protrusions 1233 are released, and the resilient portions 123 restore to drive the tabs 1231 to engage with corresponding second catches 513. The block 141 is engaged in the second block holes 517. The combined position-translating member 10, retention member 20 and slidable member 30 is thereby translated to the second position.

The storage device 60 having a different size is then slid into the bracket 50, until the latch holes of the storage device 60 are aligned with corresponding latches 213 of the retention member 20. The slidable member 30 is slid rearward, and the retention member 20 is relatively slid along the slideways 335 of the slidable member 30 until the coil springs 25 restore to drive the latches 213 to sequentially extend through corresponding through-holes 129 of the position-translating member 10 and second openings 515 to engage in the storage device 60. FIG. 8 shows the storage device 60 is securely attached in the bracket 50, and designated as at a second position.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting apparatus for a storage device, comprising:
   a bracket for receiving the storage device therein;
   a position-translating member attached to the bracket selectively at first and second positions; and
   a retention member attached to the position-translating member for securely fixing the storage device to the bracket; wherein
   a block is formed on the position-translating member, and two spaced and aligned block holes are defined in the bracket corresponding to the block to selectively position the position-translating member at the first and second positions.

2. The mounting apparatus as claimed in claim 1, wherein at least two spaced catches are formed on a sidewall of the bracket to position the position-translating member at the first and second positions respectively.

3. The mounting apparatus as claimed in claim 2, wherein at least one tab is formed on the position-translating member to selectively engage with one of said catches.

4. The mounting apparatus as claimed in claim 1, wherein at least two spaced retaining pieces are formed on the bracket to movably attach the position-translating member to the bracket.

5. The mounting apparatus as claimed in claim 1, further comprising a slidable member, the retention member movably received in the slidable member.

6. The mounting apparatus as claimed in claim 5, wherein at least one resilient member is provided to drive the retention member to engage the storage device.

7. The mounting apparatus as claimed in claim 6, wherein said resilient member is a coil spring.

8. The mounting apparatus as claimed in claim 6, wherein a pair of slideways is defined in the slidable member, and a pair of sliding portions are formed on the retention member corresponding to the slideways.

9. A mounting apparatus comprising:
   a bracket for accommodating a device therein, the bracket comprising at least one sidewall;
   a position-translating member movably attached to an outside of said sidewall and movable along said sidewall in a first direction between a first position and a second position; and
   at least one latch carried on the position-translating member;
   wherein said latch is movable and extendable through the position-translating member and said sidewall of the bracket sequentially in a second direction perpendicular to the first direction for fixing the device in the bracket whenever the position-translating member is in the first or second position.

10. The mounting apparatus as claimed in claim 9, wherein at least two spaced catches are formed on said sidewall of the bracket to position the position-translating member at the first and second positions respectively, and at least one tab is formed on the position-translating member to selectively engage with one of said catches.

11. The mounting apparatus as claimed in claim 10, wherein first and second openings are defined in said sidewall corresponding said latch at the first and second positions respectively.

12. The mounting apparatus as claimed in claim 9, wherein a block is formed on the position-translating member, and two spaced and aligned block holes are defined in the bracket corresponding to the block to selectively position the position-translating member at the first and second positions.

13. The mounting apparatus as claimed in claim 9, further comprising a retention member, and said latch formed on the retention member.

14. The mounting apparatus as claimed in claim 13, further comprising a slidable member relatively slidably receiving the retention member therein.

15. The mounting apparatus as claimed in claim 14, wherein at least one resilient member is attached to the retention member and drives the retention member toward the bracket.

16. A mounting apparatus comprising:
   a bracket comprising a plurality of walls cooperatively defining a space for receiving devices therein, at least two sets of holes defined in one of the walls;
   a position-translating member detachably attached to said wall of the bracket, a plurality of through-holes defined in the position-translating member, the position-translating member capable of being moved relative to said wall to positions where each set of holes of the bracket is defined with said through-holes in alignment with said set of holes;
   a slidable member movably carried on the position-translating member; and
   a retention member movably received in the slidable member, a plurality of latches formed on the retention member to be extended through said through holes of the position-translating member and corresponding set of holes respectively for fixing the device to the bracket.

17. The mounting apparatus as claimed in claim 16, wherein a pair of slideways is defined in each of opposite horizontal walls of the slidable member, and a plurality of sliding portions is formed on the retention member corresponding to the slideways of the slidable member respectively.

18. The mounting apparatus as claimed in claim 17, wherein a pair of screws attaches the retention member to the position-translating member.

19. A mounting apparatus for a device securable into a bracket of an electronic apparatus, comprising:
- a slidable member detachably attached to an outer side of said bracket and slidably movable along said side of said bracket from a first position to a second position; and
- a retention member movably attached to said slidable member, and comprising a plurality of latches extendable into said bracket so as to engage with said device in case of moving said slidable member to said first position and disengage from said device in case of moving said slidable member to said second position.

20. The mounting apparatus as claimed in claim 19, wherein said retention member moves from an attached position for engaging with said device to another attached position for disengaging from said device along a direction perpendicular to a moving direction of said slidable member from said first position thereof to said second position thereof.

21. The mounting apparatus as claimed in claim 19, further comprising a position-translating member to carry said slidable member and detachably attached to said side of said bracket together with said slidable member.

22. The mounting apparatus as claimed in claim 21, wherein said position-translating member with said slidable member is detachably attachable to at least two locations on said side of said bracket.

23. The mounting apparatus as claimed in claim 19, wherein said plurality of latches of said retention member is respectively extendable through said slidable member to reachably engage with said drive.

* * * * *